May 23, 1967 R. J. LUSSIER 3,321,750

MAGNETIC PULSE COUNTERS

Filed July 15, 1963 6 Sheets-Sheet 1

INVENTOR

Raymond J. Lussier

BY Connolly and Hutz

ATTORNEYS

INVENTOR
Raymond J. Lussier
BY Connolly and Hutz
ATTORNEYS

May 23, 1967 R. J. LUSSIER 3,321,750

MAGNETIC PULSE COUNTERS

Filed July 15, 1963 6 Sheets-Sheet 3

INVENTOR

Raymond J. Lussier

BY Connolly and Hutz

ATTORNEYS

INVENTOR
Raymond J. Lussier
BY Connolly and Hutz
ATTORNEYS

May 23, 1967 R. J. LUSSIER 3,321,750

MAGNETIC PULSE COUNTERS

Filed July 15, 1963 6 Sheets-Sheet 5

INVENTOR
Raymond J. Lussier

BY Connolly and Hutz
ATTORNEYS

INVENTOR
Raymond J. Lussier
BY Connolly and Hutz
ATTORNEYS

United States Patent Office 3,321,750

Patented May 23, 1967

3,321,750
MAGNETIC PULSE COUNTERS

Raymond J. Lussier, Williamstown, Mass., assignor to Sprague Electric Company, North Adams, Mass., a corporation of Massachusetts Filed July 15, 1963, Ser. No. 295,170
16 Claims. (Cl. 340—174)

ABSTRACT OF THE DISCLOSURE

A first magnetic counting core is connected to a source of pulses to be counted and to a second magnetic counting core in an adding arrangement such that the second core is stepwise pulsed to saturation in one direction after the first core has been pulsed to saturation. The output circuits of a first and second transistor are respectively coupled to each core and the conductivity of both transistors is controlled by the saturation of the second core so as to reset both cores simultaneously to saturation in the other direction and to provide an output pulse once the count is completed.

The present invention relates to the counting of electrical pulses, more particularly apparatus by which such counting is effected.

Among the objects of the present invention is the provision of improved apparatus of the above type which are of relatively simple construction and highly efficient in operation.

Further objects of the present invention include the provision of novel circuits for use with pulse counters.

The above as well as additional objects of the present invention will be more fully understood from the following description of several of its exemplifications, reference being made to the accompanying drawings wherein.

Figure 1:
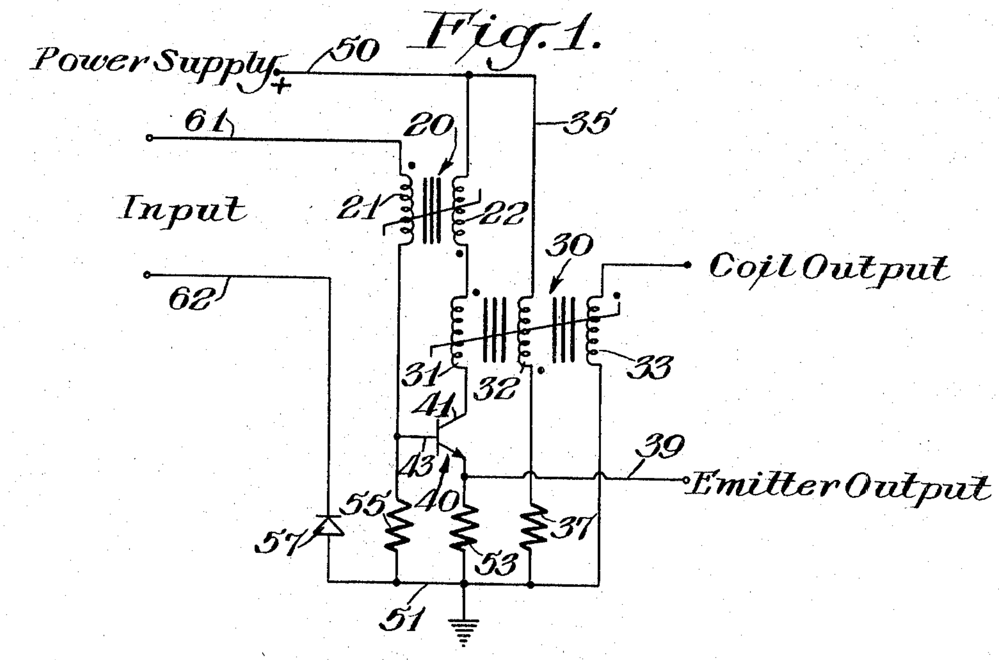
FIG. 1 is a circuit diagram of a simple form of counter representative of the present invention.

Pulse counters of the type shown in U.S. Patents No. 2,824,697, granted Feb. 25, 1958, and No. 2,897,380, granted July 28, 1959, are highly practical and desirable devices. However, they are relatively complex constructions in order to safeguard against difficulties when they are connected together in cascade, for example. The provision of power supplies for operating such counters can also be troublesome.

According to the present invention an improved pulse counter consists essentially of a magnetic counting core, a magnetic output core, a transistor or other amplifier, and passive input and output circuits for the amplifier, the counting core having two windings connected respectively in the input and output circuits of the transistor to cause pulses applied to the input circuit to stepwise shift the magnetic condition of that core to saturation in one direction and then switch the magnetic condition to saturation in the opposite direction in one step, the output core having a first winding in the output circuit of the transistor, and a second winding which develops an output signal each time the counting core is switched.

The magnetic counting core is of the rectangular hysteresis type described in the foregoing patents, but the output core can be one that either has the same type of rectangular hysteresis or it can have the more conventional rounded hysteresis loop. An output core of rectangular hysteresis is preferably operated between magnetic saturation in one direction and magnetic saturation in the opposing direction and being switched between these two conditions to indicate that a count cycle has been completed. Such a core generally calls for a resetting arrangement to restore its magnetic condition to that at which it is prepared to deliver another output count.

Counters of the above type are readily cascaded together by merely connecting the output of one counter to the input of another, and no significant loss of accuracy is thereby incurred. When two or more such counters are cascaded and the output cores of each has a resetting winding, these resetting windings can be connected together in series to minimize the current drain. The pulses supplied to the initial counter can be delivered from a magnetic supply core that is switched and also has a resetting winding, in which case the resetting winding of such supply core can be connected in the same series string as the resetting windings of the counters.

The input circuit for the transistor of an individual counter preferably consists essentially of a diode and a resistor in series with each other and in series with one winding of the counting core across pulse input leads, the transistor having its input connected essentially across the resistor.

The output circuit for such transistor can consist essentially of one winding of the counting core connected in series with the first winding of the output core to the collector of the transistor, and a bias supply connected to the emitter of the transistor.

A feature of the present invention is that the power supply for operating the transistor or other amplifier in an individual counter or a group of counters can either be of the D.C. type, as described in the foregoing patents, or they can be simple A.C. supplies that do not have the rectification and filtering normally used to convert A.C. to D.C. The latter type of power supply can merely be ararnged to deliver pulses of power that are synchronized with the pulses to be counted. With such a combination it is not necessary to have the usual types of amplifiers to control the pulse counting and switching. Instead, a triggering network free of amplifiers can be so used.

Pursuant to the present invention, AC power supplies can be used to energize counters that count the cycles of AC power. One effective arrangement of this type has a pulse supply circuit with a phase shifter connected to leads for supplying the AC energizing power and also connected to a pulse former for developing counting pulses of substantially identical volt-second characteristics during the peak portions of the energizing power cycles.

Referring now to the drawings, the counter illustrated in FIG. 1 has a magnetic counting core 20 with two windings, 21, 22. It also has a magnetic output core 30 having three windings 31, 32 and 33. A transistor 40 has its collector 41 connected through winding 31 of the output core and winding 22 of the counting core to a power supply lead 50. Electrical operating power is delivered between lead 50 and the ground return 51, and a current limiting resistor 53 connects the transistor emitter 42 with the ground return. The base terminal 43 of the transistor is also returned to ground through a resistor shown at 55. Base 43 is connected through winding 21 of the counting core to an input terminal 61. Another input terminal 62 is connected to ground return 51 through a diode 57.

Winding 32 of output core 30 is in a resetting circuit completed by a lead 35 that connects one end of the winding to power supply lead 50, and a current limiting resistor 37 which connects the other end of winding 32 to the ground return.

Winding 33 of core 30 is an output winding which develops a pulse count signal after a predetermined number of pulses are supplied between input leads 61, 62. The count of the counter is accordingly obtainable from the output winding 33, one end of which can be returned to ground. A lead shown at 39 can also be used to derive a count signal from the emitter of the transistor.

Counting core 20 and its two windings operate in the general manner described in detail in Patent 2,897,380. In the illustrated form of counter, positive-going pulses that are supplied to input leads 61, 62 are passed through the counter core winding 21, resistor 55, as well as diode 57. The diode permits such pulses to pass through those windings but blocks pulses in the other direction. Considering core 20 as magnetically saturated in one direction, winding 21 is polarized so that the positive-going pulses it carries stepwise reduce the magnetization and then build up stepwise a magnetization in the opposite direction. Resistor 55 is selected to have a resistance much smaller than the inductive impedance of winding 21 during all of the above stepwise changes so long as the magnetization of the counting core is not completely saturated. Winding 21 is also arranged so that it has a relatively small resistance as compared to the resistance of resistor 55. Accordingly, the input pulses develop generally across winding 21 until the pulses effect the saturation of the counting core in the reverse direction. At that time the impedance of the input circuit is essentially resistor 55 so that pulses will then develop a relatively high voltage between the transistor base 43 and the ground return. The resulting high positive potential at the base overcomes the threshold of transistor 40 and renders the transistor conductive. A pulse of current accordingly flows from power supply lead 50 through winding 22 of the counting core, winding 31 of the output core, the collector-emitter circuit of the transistor, and through limiting resistor 53. The transistor circuit then operates as a blocking oscillator with the pulse through winding 22 inducing in winding 21 a pulse opposite in direction to the original counted pulses. This oppositely directed pulse keeps the transistor base 43 strongly positive with respect to the ground return and holds the transistor in conductive condition. The effect of making the transistor conductive is to pass sufficient current through winding 22 to cause the magnetization of the counting core to be reset to the original saturated condition at which it began its counting. After the resetting is completed, the induction between windings 21 and 22 drops off sharply by reason of the saturated condition of the counting core. The voltage at the transistor's base then drops off below the threshold value and the conductivity of the transistor ceases. The counting cycle is now ready to be repeated.

The passage of current through the transistor during its on-time also causes a pulse to be developed across output winding 33 by transformer action from the current pulse through winding 31. This current is, moreover, sufficient to switch output core 30 to saturated magnetic condition in the proper direction. However, winding 32 through which current passes continuously, is arranged to pass a magnitude of current sufficient to more gradually reverse the magnetic state of output core 30 to an oppositely saturated state. Upon such reversal the output core is also ready for the next count.

The emitter resistor 53 can be omitted, that is short-circuited, inasmuch as the above counting operation does not require any significant bias on the base. Keeping the base at emitter potential, in the unactivated condition, that is in the absence of pulses, will provide accurate counting. However, where there is likely to be some electrical noise that could give rise to false counts, the use of emitter or base bias, as by a pair of voltage dropping resistors, will reduce the tendency to false counting by raising the level the base potential has to reach before it turns on the transistor.

A suitably polarized diode can also be used in place of the emitter resistor to provide a junction potential that establishes a relatively high bias with relatively little resistance to current flow. A silicon diode will in this way provide a larger bias than a germanium diode. A resistor can also be connected in series with the biasing diode to provide a suitable impedance between the emitter and ground, for enabling the take-off of count signals from the emitter electrode as by means of output lead 39. This auxiliary output is provided by the emitter resistor whether or not a biasing diode is used.

The transistor 40 is shown as of the NPN type, but PNP transistors can also be used and will function in the same manner by merely reversing the polarity of the power supply, the polarity of diode 57, and the polarity of the pulses to be counted. An amplifying type of vacuum tube such as a triode can also be substituted for the transistor, with the triode's grid, anode and cathode connected in the same way as the base, collector and emitter, respectively. Other amplifier arrangements such as unijunction transistors, tunnel diodes and the like can also be used in place of transistor 40.

Reset winding 32 is not needed, as for example when the output core 30 is of the rounded hysteresis type. Such a core does not have to be reset inasmuch as it can be merely switched between magnetic saturation in one direction and the residual flux condition that it subsides into upon removal of the magnetic field that causes such saturation. Such switching gives accurately reproducible volt-second outputs from the output winding 33, and also reduces the expense of building the counter inasmuch as the rounded hysteresis cores are less expensive than those of rectangular hysteresis characteristics.

A feature of the counter of FIG. 1 is that it can be directly cascaded with one or more additional counters to provide accurate multiplication of the counting. No buffer or other isolation is needed in such cascade connections to keep the individual counting stages from adversely affecting its companion stages by reason of the unavoidable magnetic and electric changes that accompany the counting. For example, each pulse counted is accomplanied by flux changes in the counting core magnetically induced by, but not a part of, the original pulse. The excessive fall-back of the magnetic flux in the core after each pulse, in accordance with Lenz's law, is an instance of an undesired signal of this type. In addition every resetting pulse produces feedback. When cascading two or more counting stages that do not have the output core 30, the undesired signals thus produced render counting inaccurate unless a buffer amplifier is inserted between successive stages. The use of the output core as described above gives accurately counting cascades without requiring amplifiers or other active circuit components, notwithstanding the fact that the output core introduces still another resetting function along with the feedback that accompanies it.

Figure 2:
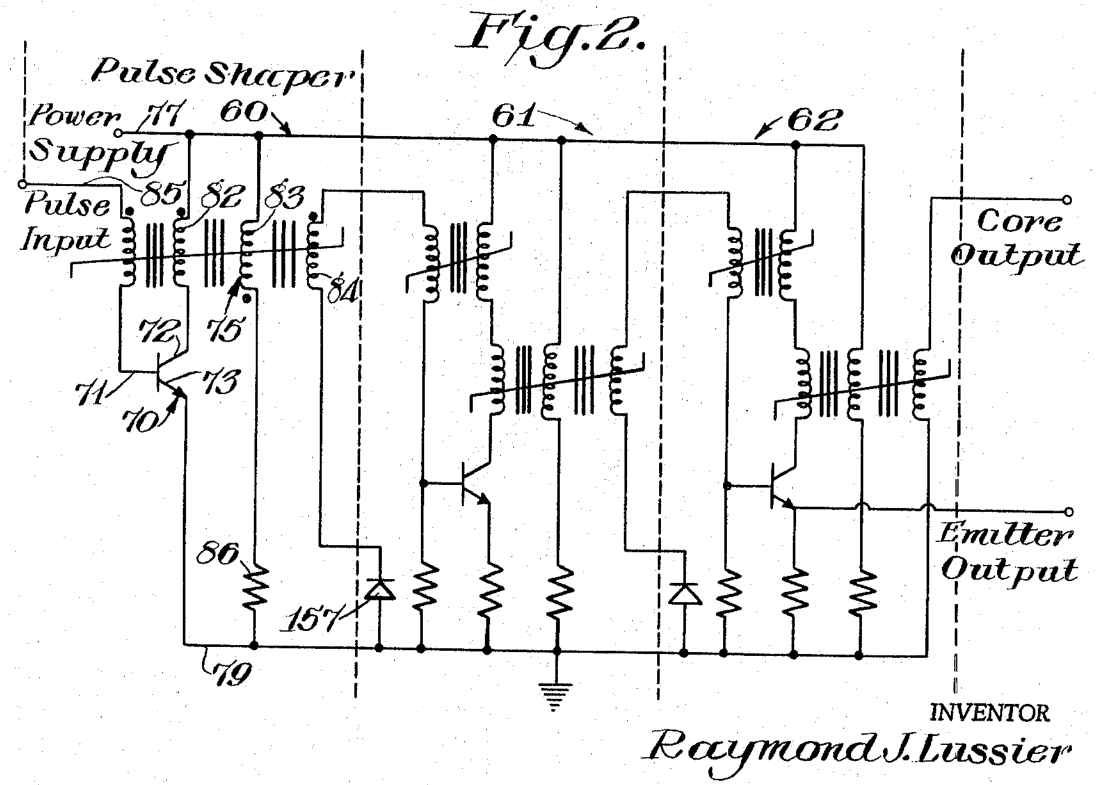
FIG. 2 is a circuit diagram showing a cascaded set of counters along with a pulse supply circuit according to the present invention.

FIG. 2 illustrates a two-stage counter having a first counter 61 and a second counter 62, each of the type shown in FIG. 1. The input of the first counter is supplied with pulses from a pulse shaper 60 that delivers pulses of constant volt-second characteristics. Shaper 60 has a transistor 70 and a rectangular hysteresis core 75 with four windings 81, 82, 83, and 84. Windings 81 and 82 are connected in a transformer-coupled regenerative amplifier circuit with the transistor, winding 81 having a pulse input lead 85, winding 82 going to a power supply lead 77. The other ends of these two windings run to the base 71 and collector 72 respectively, of transistor 70. A ground return from emitter 73 of the transistor 70, completes the pulse input and power supply circuits.

Positive-going pulses impressed between leads 85 and 79 will turn on transistor 70 and thus cause a surge of current to pass through winding 82. This surge develops additional positive-going current in winding 81 by means of the regenerative amplification action, and the positive-going current continues until the core of transformer 75 saturates. This terminates the flow of current through winding 81 and the transistor then turns off.

Winding 83 is connected to continually carry current sufficient to reset its core into saturation in the opposite direction, when the transistor is not conducting. A current limiting resistor 86 can be connected in series with winding 83 so that when connected across the power supply leads 77 and 79, the proper amount of current flows through winding 83 to effect resetting yet permit the magnetizing effect of that current to be swamped out by the transistor-on current.

Resetting of the core 75 prepares the pulse shaper 60 for the next incoming pulse. At the same time winding 84 delivers a shaped positive-going pulse to the input winding of the first counter 61, corresponding to the current surge in winding 82. Since the volt-seconds of this surge is determined by the magnetization required to switch core 75 from saturation in one direction to saturation in the opposite direction, it is constant and reproduced with each incoming pulse, regardless of the variation in strength of these incoming pulses, so long as they have an amplitude sufficient to turn on transistor 70.

To reduce the triggering of output pulses by undesired electrical noise or the like in the incoming pulse circuit a diode or the like can be inserted in that circuit to provide a potential threshold incoming signals have to exceed before they turn on transistor 70.

Output winding 84 will also develop negative-going pulses corresponding ot the resettings of the core 75, but the input circuit for the first counter includes a blocking diode 157 polarized to keep such pulses from having any effect on the counting.

The circuit of FIG. 2 counts pulses with an accuracy that is absolute. A total count of 100 is thus obtained with the following parameters:

Core 75—.17 inch by .249 inch cross section made by winding a tape of 4–79 Mo-Perm alloy .000125 inch thick, with an internal diameter of .188 inch.
Winding 81—75 turns
Winding 82—100 turns
Winding 83—100 turns of No. 42 AWG wire
Winding 84—50 turns
Transistor 70—2N2221 type
Resistor 86—1500 ohms
Counting cores—.17 inch by .249 inch cross section made by winding a tape of 4–79 Mo-Perm alloy .000125 inch thick, with an internal diameter of .188 inch.
Input winding of counting core—350 turns
Feedback winding of counting cores—150 turns
Output cores—.17 inch by .249 inch cross section made by winding a tape of 4–79 Mo-Perm alloy .000125 inch thick, with an internal diameter of .188 inch.
Transistor winding of the output core—25 turns
Reset Winding of the output core—75 turns of No. 42 AWG wire
Output winding of the output core—50 turns
Counter transistor—2N2221 type
Base resistor—221 ohms
Emitter resistor—47 ohms
Input diode for counter—1N270 type
Operating voltage supply—12 volts Each counter stage then counts 10 pulses and at every tenth pulse delivers an output pulse at its output circuit. The count of a counter stage can be varied as by varying the output pulses of the pulse shaper stage so as to change their volt-second characteristic. Increasing their volt-seconds causes the counter core in the following stage to become switched to saturation with fewer pulses, and vice versa. A dropping potentiometer across the output of a stage will enable such lowering of its output pulse, as will a variable resistance in series in that circuit. Changing the number of turns in the output and/or input winding will also change the count.

When not counting, stand-by power is consumed by the transistors, and also by the resetting windings. The reset drains can be reduced by connecting all or some reset windings in series so that a single current drain in one circuit will reset all the cores in that circuit. For example all resetting windings of the construction of FIG. 2 can be connected in series with each other and with a resistance of 1500 ohms, between the power supply leads.

As explained above the use of resetting current in the counter stages, or in the shaper stage, can be dispensed with by having the pertinent cores of rounded hysteresis characteristics so that the resetting is replaced by a reduction of the core flux density to the remanent value.

The number of counting stages in the construction of FIG. 2 can be increased to three, four, five or more without doing any more than directly connecting the added stages to stage 62 in the same way stage 62 is connected to stage 61.

The pulse shaper in the construction of FIG. 2 can be connected to a source of original positive-going pulses that have a minimum amplitude of 2 volts, a minimum duration of .005 millisecond, and a maximum repetition rate of 100 kilocycles per second. Pulses of this type can be obtained from the standard 60 cycle electric power, if desired, and FIG. 3 illustrates one effective construction for accomplishing such derivation.

Figure 3:
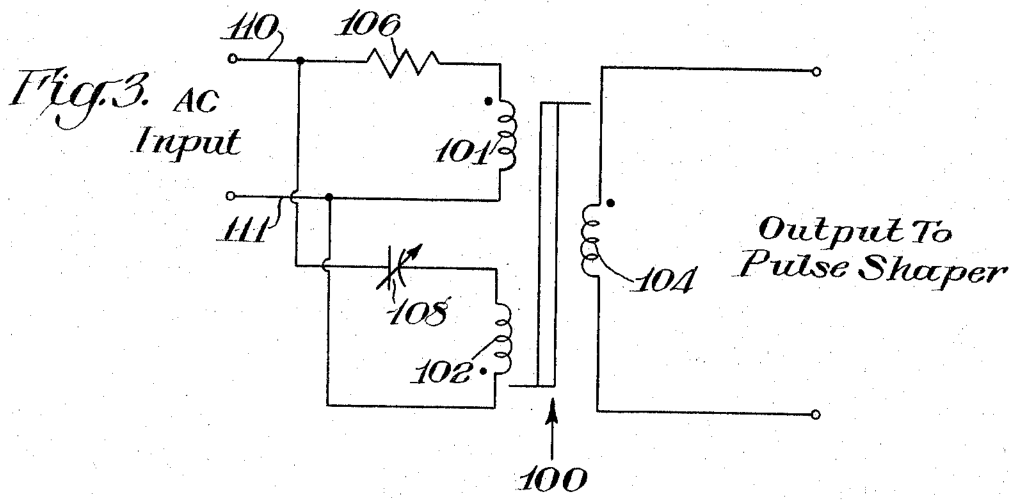
FIG. 3 is a circuit diagram of a pulse forming circuit that can be used to develop pulses from A.C. supplies pursuant to the present invention.

In FIG. 3 a magnetic core 100 having a square loop hysteresis, carries two input windings 101, 102, and an output winding 104. The two input windings form part of a phase shifting network including resistor 106 and variable capacitor 108, connected to A.C. supply leads 110, 111. The illustrated connections provide a magnetizing current in winding 101 that can be considered substantially in phase with the A.C. input, and a magnetizing current in winding 108 leading that of the current in winding 101. The exact amount of lead depends on the setting of the capacitor 108. The combination of the two currents so arranged to be enough to saturate the core 100 many times over, so that pulses are provided, as explained in connection with FIG. 4.

Figures 4, 5:
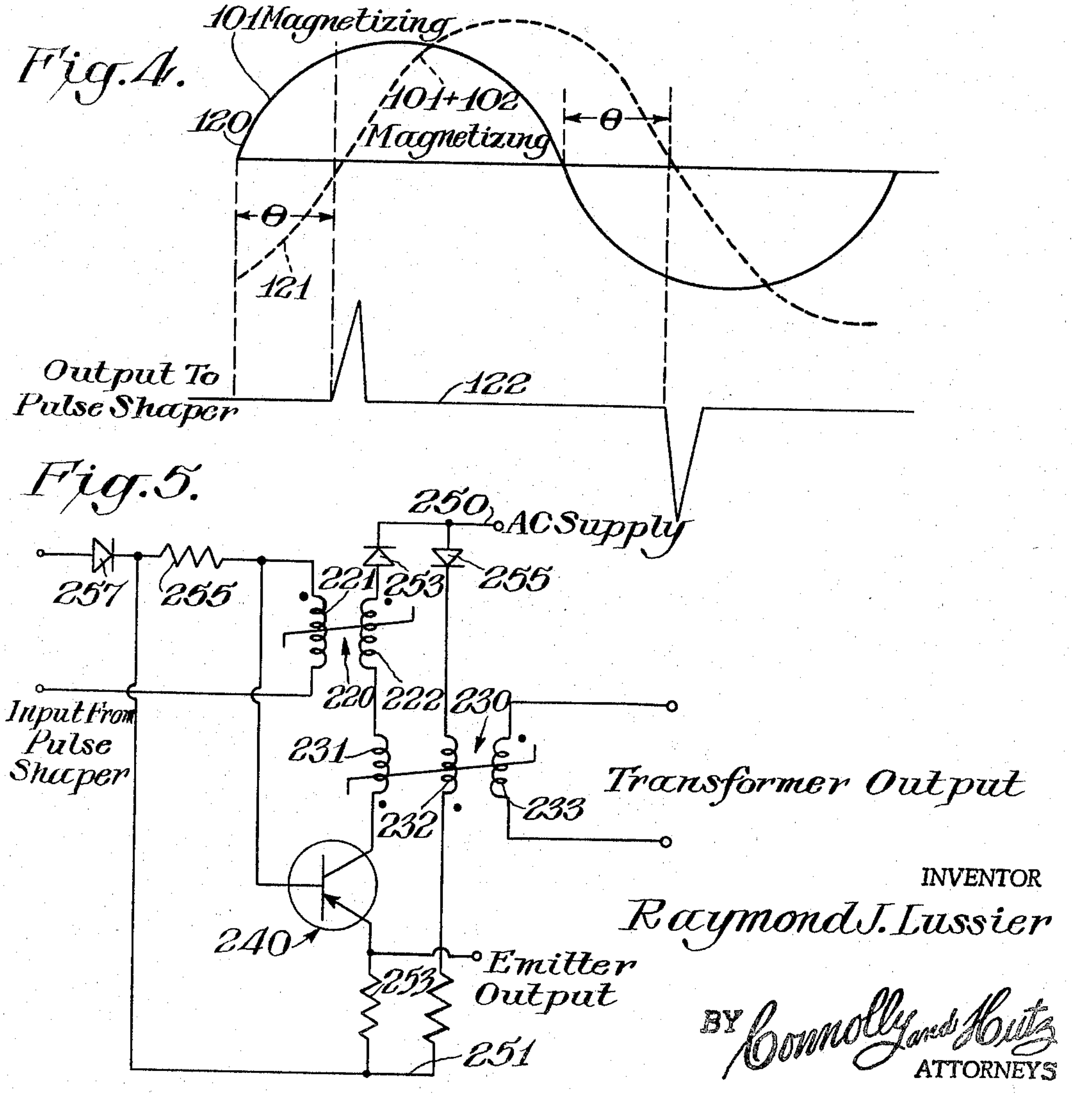
FIG. 4 illustrates the pulse-forming operation of the circuit of FIG. 3.
FIG. 5 is a circuit diagram of a modified form of pulse counter embodying the present invention.

In FIG. 4 the curve 120 represents the voltage driving the magnetizing current in winding 101. The corresponding voltage for winding 102 leads by such an amount that the sum of the two magnetizing effects is as shown in dash curve 121. Where curve 121 crosses the zero axis the core 100 has its magnetization abruptly switched to form pulses as indicated in curve 122. These pulses of magnetization induce corresponding electrical pulses in the output winding 104, and the electrical pulses can then be fed directly to the pulse shaper output leads 85, 79 in the construction of FIG. 2.

The pulse formation of the construction of FIG. 3 can be so arranged by adjustment of the phase shift in either or both input windings 101, 102, that the pulses have a predetermined phase relationship with the A.C. power supply. This is helpful in that it enables the A.C. power supply to directly power the counters used to count the resulting pulses.

FIG. 5 exemplifies such an A.C. powered counter stage. It has a counter core 220 with windings 221, 222 that can be identical with the corresponding elements of the construction of FIG. 1. A counter core 230 with three windings 231, 232, 233 can also be identified with the corresponding elements of the construction of FIG. 1. Transistor 240 and its accompanying emitter resistor 253, base resistor 255 and input diode 257 can also be identical with their FIG. 1 counterparts, although in FIG. 5, the transistor is shown of the PNP type and the diode accordingly has its polarity reversed.

The essential distinction of FIG. 5 is that the stage is directly energized by A.C. power through lead 250 and a common ground return 251. A diode 253 is in the A.C. supply connection through the counter core winding 222, output core winding 231 and transistor 240 so that current passes through these elements in the proper direction. An oppositely polarized diode 255 is in the circuit energizing reset winding 230, again to assure the proper direction of current flow.

The counter of FIG. 5 will only be energized for counting when diode 253 permits passage of a unidirectional surge of current from the A.C. supply, which is about 50% of the time. According to the present invention the incoming pulses to be counted are controlled so as to be synchronized with these unidirectional energizing surges. This is shown in FIG. 4 where curve 120 can represent the A.C. power supply voltage, and curve 122 the pulses. The positive-going pulses occur during the positive surges of the A.C. supply and the negative-going pulses during the negative surges so that either can be counted. The pulse shaper 60 of the construction of FIG. 2 will only respond to one of these two types of pulses. By timing the pulses so that they synchronize with the central portions of the A.C. surges, they will receive the benefit of the maximum A.C. power. In addition more sync variations can then be tolerated before the pulses drift completely out of counting sync.

Figure 6:
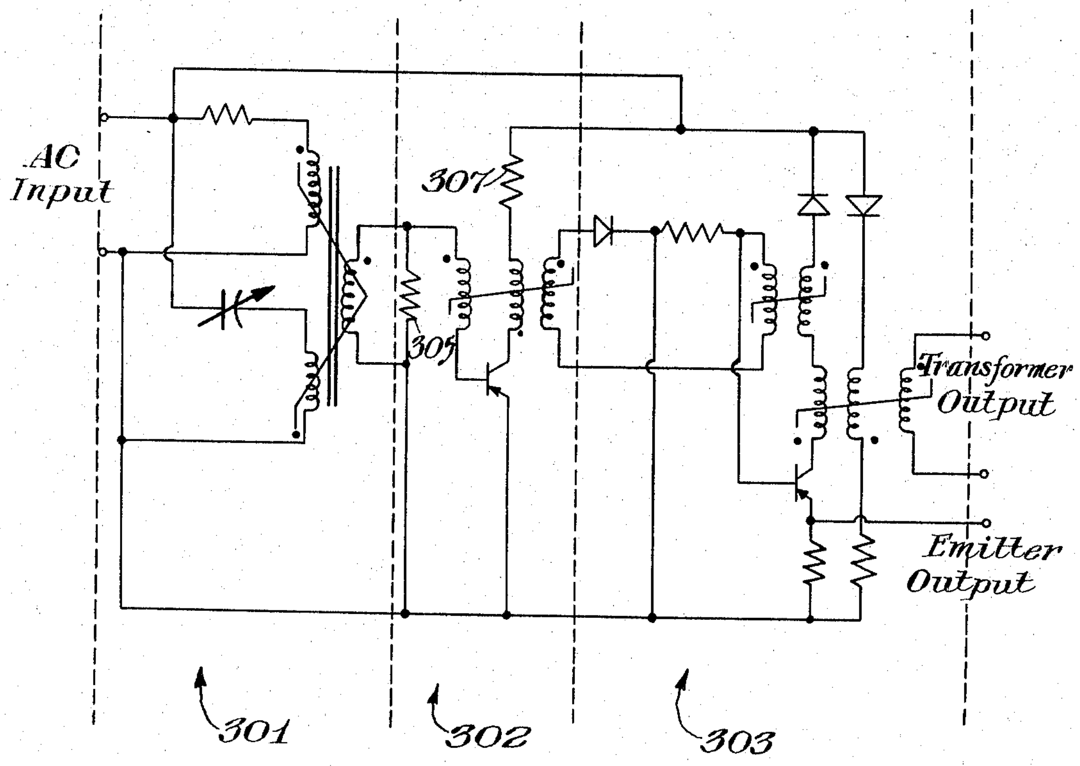
FIG. 6 is a circuit diagram of a complete counter for counting A.C. cycles.

FIG. 6 shows a complete combination for counting the cycles of A.C. power. This construction has a pulse forming stage 301, a counter stage 303, and a pulse shaper stage 302. These stages are respectively identical with the pulse former of FIG. 3, the counter of FIG. 5 (except that an extra load resistor 305 is bridged across the pulse former output), and the pulse shaper of FIG. 2 (except that core 75 returns to the opposite saturation state by conduction through winding 82 during alternate half cycles of the supply, during which time transistor 70 is operating in its inverse mode and conducting for the entire half cycle. Resistor 307 is a current limiting resistor. A separate winding such as 83 in the pulse shaper of FIG. 2 is not necessary because of the aforementioned inverse operation of the pulse shaper transistor of FIG. 2). The transistors of the FIG. 6 pulse shaper is PNP rather than NPN. The same A.C. power supply leads supply all stages. Both transistors in FIG. 6 are of the same type so that they will be both energized by the same surge of A.C. power.

Figure 7:
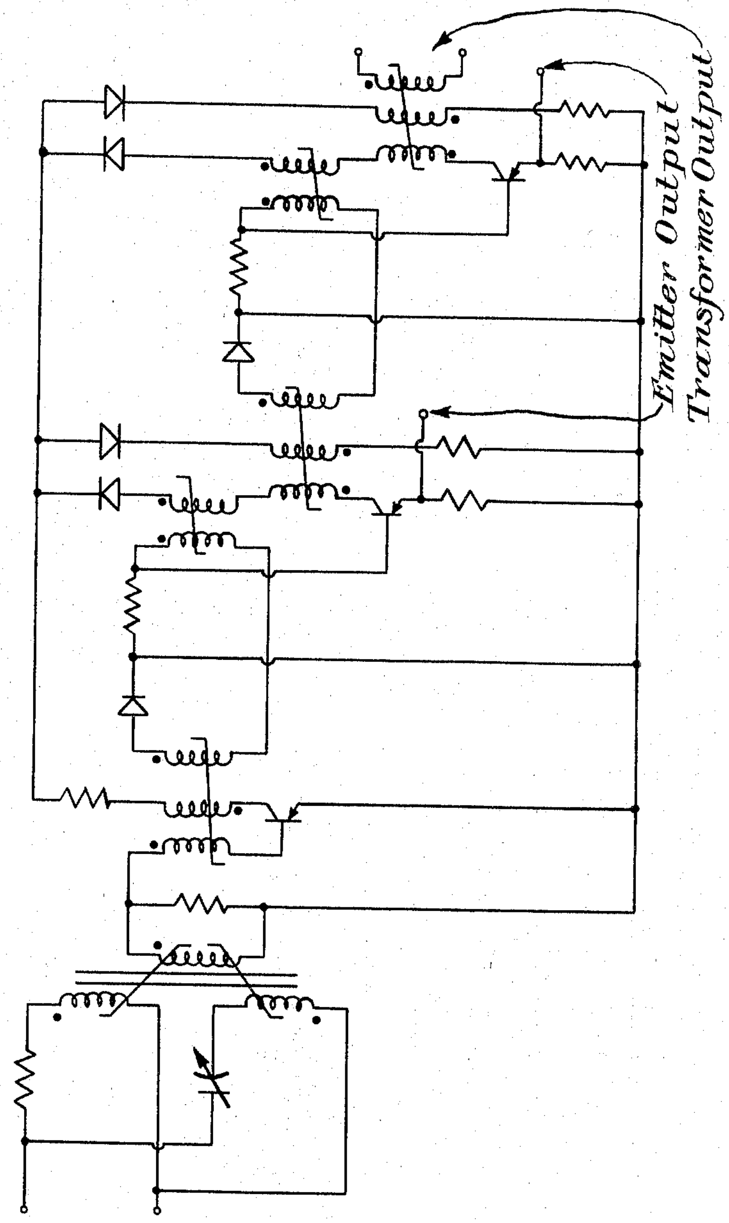
FIG. 7 is a circuit diagram similar to FIG. 6 but showing counting stages cascaded together.

The A.C. powered counter of FIGS. 5 and 6 can also be directly cascaded to multiply the count and still have absolute accuracy. FIG. 7 illustrates such a cascaded system having two counter stages identical with each other as well as with those of FIGS. 5 and 6. The assembly of FIG. 7 also includes pulse former and pulse shaper stages identical with those of FIG. 6.

Figure 8:
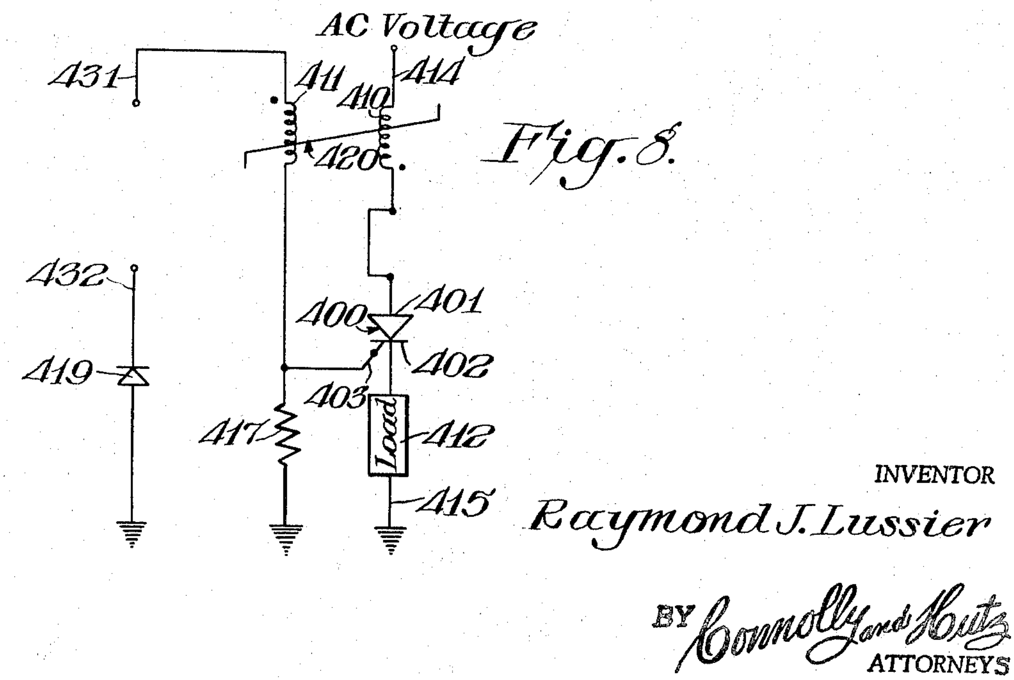
FIG. 8 is a circuit diagram of an A.C. energized pulse counter that does not have a conventional amplifier control.

FIG. 8 is an example of a modified pulse counter of the present invention. Here a triggered rectifier such as a silicon controlled rectifier 400 or thyratron is connected with its principal anode 401 and cathode 402 in series with a winding 410 of a counting core 420, and a load resistor 412, across an A.C. supply between leads 414, 415. A counting winding 411 on tthe counting core is connected in a pulse-receiving input circuit that includes resistor 417 and diode 419 as in the counting stages of FIGS. 1 and 5. The gate electrode 403 of the silicon controlled rectifier, or secondary anode, is connected to the junction between winding 411 and resistor 413 so that the gate-cathode electrode pair are subjected to the voltage appearing across the resistor 417.

Counting is effected in the construction of FIG. 8 by supplying to its input leads 431, 432 pulses that are synchronized with the current surges of the A.C. power supply. The pulses stepwise shift the magnetization of core 420 in the same way as in the prior figures, and when the core shifts into saturation, the pulse that causes this shift develops a triggering voltage across resistor 417. This triggers the silicon controlled rectifier into conductive condition and a surge of current then passes through it as well as through winding 410. This current surge begins during one of the alternating surges of the power supply and continues until the end of the half-cycle that power surge represents. The amount of current flowing in the winding 410 is accordingly quite large, and winding 410 can have a relatively small number of turns. As little as one turn will be sufficient in some cases. Where core 420 is toroidal, winding 410 can merely be a conductor passing through the center of the toroid without being wrapped around it.

The output of the counter of FIG. 8 is taken from across the load resistor 412. This output can be fed through a buffer stage such as the auxiliary amplifier of Patent 2,897,380 to another counting stage if desired. On the other hand, an output transformer as in the construction of FIGS. 1 and 5 can be added to the construction of FIG. 8, so that one of its windings is in the A.C. surge circuit through the silicon controlled rectifier. In such an embodiment of the invention the output core can have an additional winding to supply an output signal, and it can also have a reset winding as in FIGS. 1 and 5. Such reset winding is not needed where the output core is of rounded hysteresis characteristics, and is not switched between oppositely saturated conditions.

It is important for maximum counting accuracy that the counting cores in the counting stages of the present invention not be completely switched until after the termination of any switching undergone by a core in a preceding stage. The regenerative effect of the amplifier in the circuit of the counting core helps in prolonging its switching action. Lighter loading of the preceding core also helps, as does the feedback of the resetting pulse in the counter back to the preceding stage. This feedback is induced by transformer action in the input winding (21 of FIG. 1) of the counter core and is oppositely polarized with respect to the counting pulse then being received.

Pulses received at a shaper for counting should not have a duration long enough to saturate the shaper core, or the shaper will not reset properly at the end of the pulse. The incoming pulses can be differentiated as by the standard type of series capacitor and shunting resistor combination differentiating circuit, to shorten their duration. A diode can also be shunted across the pulse supply to short out pulses or other disturbances having undesired polarity.

The pulse shapers can have filtering added to their feedback windings, as by by-passing the collector of their transistor to the ground return through a series capacitor-resistor combination. This filtering helps dissipate flux fallback spikes that could otherwise interfere with the following counters.

The diode in the input circuit of a counter stage is desirably by-passed by a resistor of such magnitude as to swamp out the leakage resistance of the diode. This makes the counter more reliable and reduces temperature effects.

A manual reset can also be provided for a counter as by a normally-open switch that when closed shunts the counter's transistor.

Figure 9:
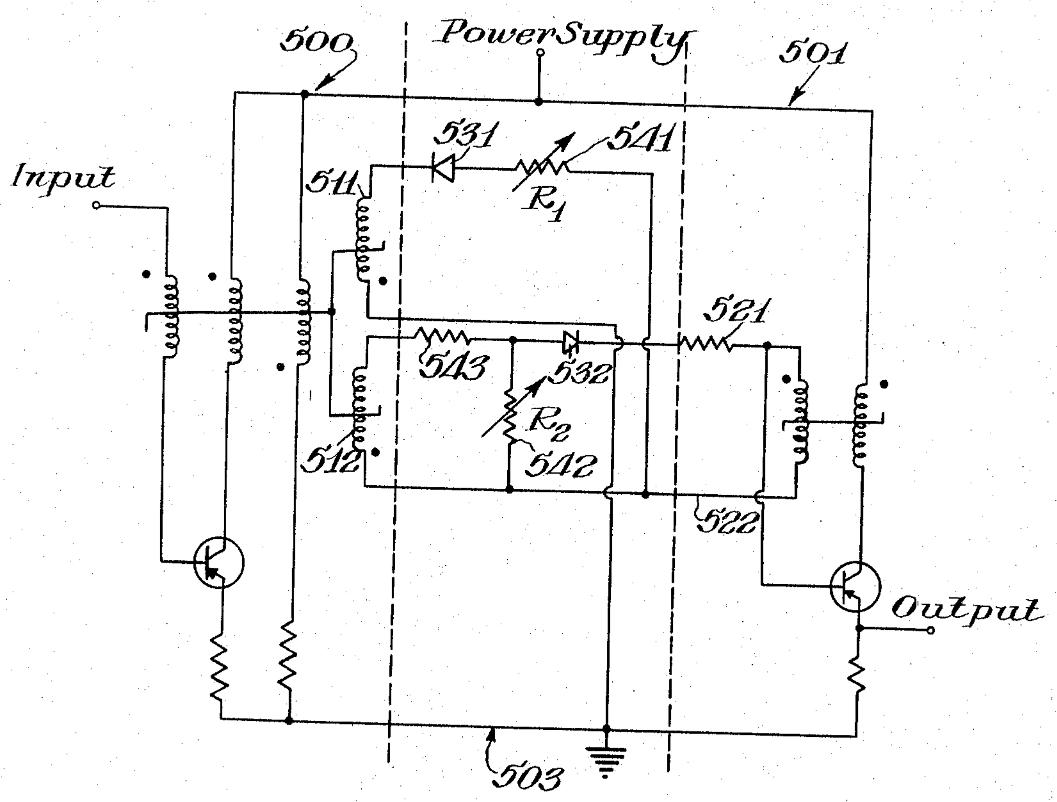
FIG. 9 is a circuit diagram of a counter suitable for adjustment to make counts of varying amounts.

According to a still further phase of the present invention, counting circuits are made to have selectable counts through the use of variable resistors in their coupling to a shaper stage. FIG. 9 shows such an arrangement with a shaper stage 500 and a counter stage 501 connected by a variable coupling network 503. The shaper stage has two output windings 511, 512 that feed in parallel to the input leads 521, 522 of the counter stage. These stages are otherwise like those of FIG. 2 with the output core omitted from the counter stage.

Instead of having a single diode in the input to the counter stage, two different diodes 531, 532 are separately connected in the separate branches of the coupling network. Variable resistor 541 is in series in one branch, while a second variable resistor 542 is shunt connected across the second branch. A third resistor that need not be variable can be connected in series in the second branch. With resistor 541 set to its maximum, resistor 542 can be adjusted to shunt much of the output of the forming stage so that from 5 to 10 pulses are needed to obtain a count of one from the counting stage. By reducing resistance 541 and varying resistor 542, more signal is transferred by the coupling network so that from 2 to 4 pulses can be used to get a count of 1 at the counting stage.

The counting stage 501 is illustrated with only an emitter output, but it can have a transformer output by inserting an output transformer in its transistor circuit, as in the construction of FIG. 1.

Counts of more than about 10 from a single counter are not too reliable. For larger counts using a cascade, multiples of one stage counts are readily provided, but these will not be suitable for odd-numbered counts such as 11, 13, 17, and 19. For such counts separate counting stages can be connected so that one goes through a few counts and then the counting is transferred to the other. This makes the counts of the individual stages add together, and when the desired maximum count is reached both stages are reset together.

Figure 10:
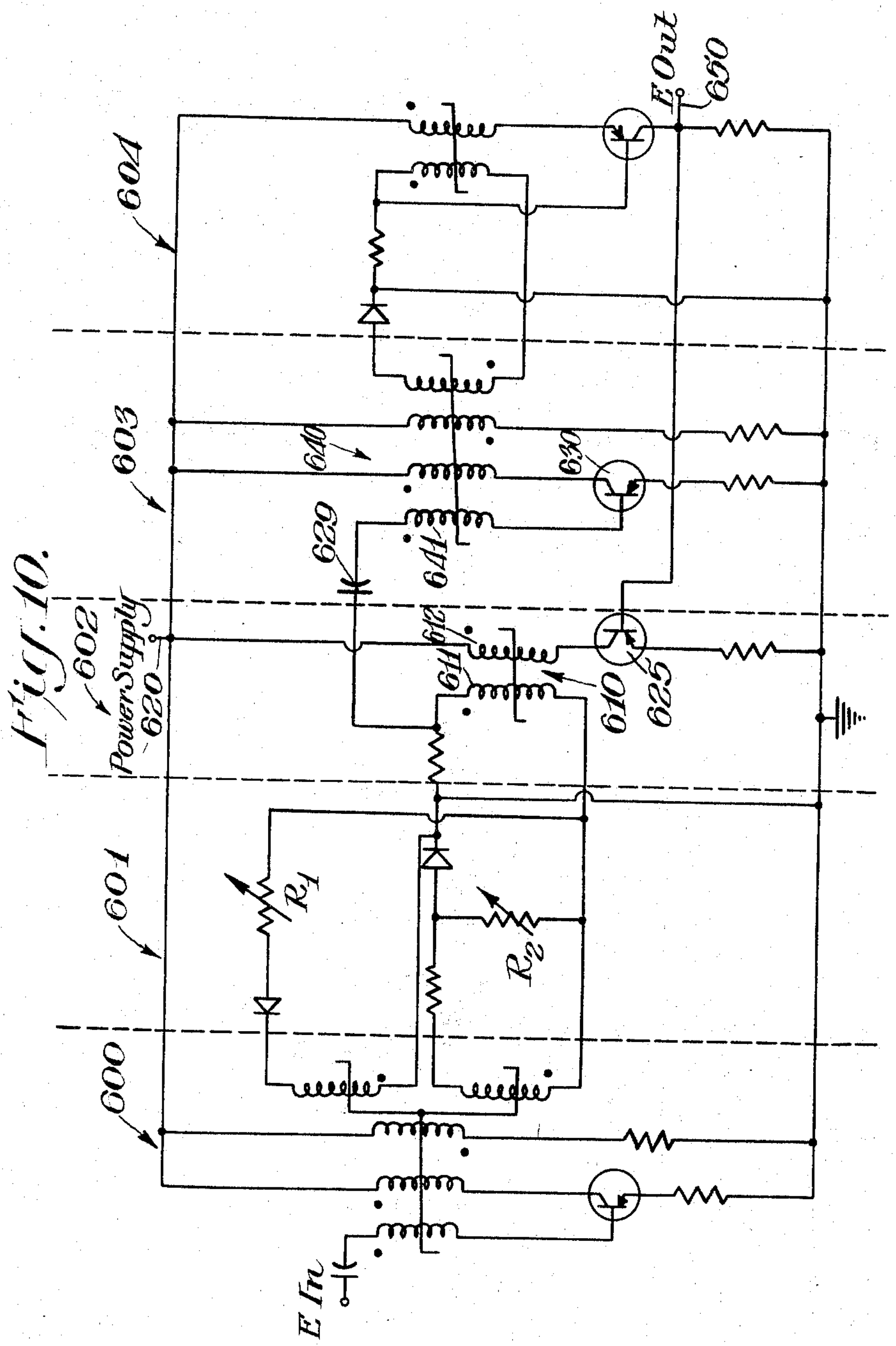
FIG. 10 is a circuit diagram of a counter that adds the counts of two counting stages one of which can be adjustable.

FIG. 10 is a circuit of the last-mentioned type. It has a pulse shaper stage 600 and a variable coupling stage 601 like those of FIG. 9. A first counting stage has a counting core 610 which like that of stage 501 in FIG. 9 will saturate in from 1 to 10 pulses received at its counting winding 611. A feedback winding 612 on the counting core is conected in series in power supply circuit from power supply lead 620 through transistor 625 to ground return 621. Instead of having the base of transistor 625 respond to saturation of core 610, a different transistor 630 in a second pulse forming stage 603 has its base lead connected through capacitor 629 and input winding 641 of pulse forming core 640, to so respond. Stage 603 forms standard volt-seconds pulses from those received at winding 641 and delivers those standard pulses to another 10 counter stage 604 for counting. When the final 10 count is reached the transistor of the counter stage 604 becomes conductive delivering a signal to output lead 650, and also to the base of transistor 625, thus causing core 610 to reset whenever stage 604 is reset.

By adjustment of the variable resistors in coupling stage 601 the maximum count of stage 602 can be selected anywhere between 1 and 10, as indicated in connection with FIG. 9, and the second stage 604 will then count a fixed number of pulses, 10 or more, for example. The overall count will thus be selectible between 10 and 20.

A transformer output can also be provided in the transistor circuit of stage 604, as described above.

More stages can also be strung together as in FIG. 10 to add up counts beyond 20, or can be cascaded to multiply the counts. Such combinations of stages can also be A.C. operated as in the construction of FIGS. 5, 6, and 7. Alternatively the A.C. operated stages can be used without their output cores to give emitter output signals that can be cascaded through buffer stages if desired.

Any of the foregoing combinations can be readily provided on a printed circuit board to make a very compact and easily manufactured unit.

I claim:

1. A pulse counter consisting essentially of: a first and second magnetic counting core; a magnetic output core; a first and second transistor in connection to said first and second counting cores respectively; and passive input and output circuits for the transistors; each of said counting cores having at least two windings; a first winding of said first core in connection to a source of pulses to be counted and to a first winding of said second core to cause a stepwise shifting of said first core to saturation in one direction, and therafter a stepwise shifting of said second core to saturation in one direction which adds the counts of said counting cores; a second winding of both counting cores in connection to an output circuit of their respective transistors to switch each of said cores to saturation in the opposite direction once their respective transistors become conductive; the input circuit of said second transistor in connection to said first winding of said second core to cause said second transistor to become conductive upon saturation of said second core in said one direction, and the input circuit of said first transistor in connection to the output circuit of said second transistor to render said first transistor conductive with said second transistor thereby switching both counting cores in the other direction once said second core is shifted to saturation in said one direction; and said output core having a first winding in the output circuit of said second transistor, and a second winding which develops an output signal each time said second core is switched.

2. The combination of claim 1, including a variable coupling network connecting said pulse source to said first core, said variable coupling network providing a parallel feed to said first core to provide a wide variation in the number of pulses required to cause said shift of said cores to saturation in said one direction.

3. The combination of claim 1 in which the output core is connected for switching from saturation in one direction to saturation in the opposite direction each time the second counting core is so switched, and the output core also has a third winding connected to automatically reset the output core to saturation in said one direction after the switching is completed.

4. A pulse counter having two counting stages according to claim 3, the output winding of one stage being directly connected to the input circuit of the other stage to cascade the stages together.

5. The combination of claim 4 in which the reset windings of the two stages are connected together in series.

6. The combination of claim 4 in which the input circuit of the first stage is connected to a magnetic core pulse supply circuit that delivers pulses developed by switching of a magnetic core from saturation in one direction to saturation in the opposite direction, the pulse supply circuit including a reset winding to reset its core after the switching, this reset winding of the pulse supply circuit and the reset windings of the two counting stages being all connected in series.

7. A pulse counter having two counting stages according to claim 1, the output winding of one stage being directly connected to the input circuit of the other stage to cascade the stages together.

8. The combination of claim 7 in which the input circuit of the first stage is connected to a magnetic core pulse supply circuit that delivers to said input circuit pulses developed by shifting of the magnetic condition of a magnetic core.

9. The combination of claim 1 in which each transistor has a power supply connection to the source of pulses to be counted.

10. The combination of claim 9 in which the power supply connection is to a source of alternating current.

11. A counter for A.C. pulses, said counter having a first magnetic counting core with a pair of windings, a second magnetic counting core with a pair of windings, a triggering network connected to trigger a flow of current through one of the windings of each core, the other winding of each core being connected to an A.C. pulse supply circuit for causing the pulses to stepwise shift the magnetic condition of the first and then the second core to saturation in one direction, the triggering network being connected to the pulse supply circuit for causing an incoming core-saturating pulse to trigger said current and thereby reset the cores to saturation in the opposite direction, indicating means for signaling the resettings, and an A.C. power supply circuit for the triggering network connected to supply pulses of power to the triggering circuit in synchronism with the pulses to be counted.

12. The combination of claim 11 in which the triggering network is a transistor type blocking oscillator.

13. The combination of claim 11 in which the triggering network is a triggered rectifier.

14. The combination of claim 11 in which the power supply circuit is also connected to supply the pulses for counting.

15. The combination of claim 14 including a phase shifter connected to leads for supplying the A.C. energizing power and also connected to a pulse former for developing counting pulses of substantially identical volt-second characteristics during the peak portions of the energizing power cycles.

16. A counter for A.C. pulses, said counter consisting essentially of: a first and a second magnetic counting core; a first and a second transistor; passive input and output circuits for the transistors; and a magnetic output core; each of said counting cores having two windings; one winding of said first core in connection to a source of A.C. pulses and to one winding of said second core to cause said pulses to stepwise shift the magnetic condition of said first core and then said second core to saturation in one direction, thereby adding the pulse counts of both; the other winding of said first and second cores in connection to an A.C. power supply and the output circuits of said first and second transistors respectively to switch said counting cores to saturation in the other direction once their respective transistors become conductive; the input of said first transistor in connection to the output of said second transistor, and the input of said second transistor in connection to said one winding of said second core to cause said first and second transistor to become conductive upon saturation of said second core in said one direction; and said output core having a first winding in the output circuit of said second transistor and a second winding which develops an output signal each time the second counting core is switched.

References Cited by the Examiner

UNITED STATES PATENTS

| | | | |
|---|---|---|---|
| 2,838,669 | 6/1958 | Horsch | 307—88 X |
| 3,071,695 | 1/1963 | Richards | 307—88 |
| 3,109,936 | 11/1963 | Rennie | 307—88 |

BERNARD KONICK, *Primary Examiner.*

S. M. URYNOWICZ, *Assistant Examiner.*